US011196755B2

(12) United States Patent
Qiu

(10) Patent No.: US 11,196,755 B2
(45) Date of Patent: Dec. 7, 2021

(54) CROSS-BLOCKCHAIN INTERACTION SYSTEMS

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/163,348

(22) Filed: Jan. 30, 2021

(65) Prior Publication Data
US 2021/0160252 A1 May 27, 2021

Related U.S. Application Data

(63) Continuation of application No. PCT/CN2019/106610, filed on Sep. 19, 2019.

(30) Foreign Application Priority Data

Nov. 16, 2018 (CN) .......................... 201811364463.0

(51) Int. Cl.
*H04L 29/06* (2006.01)
(52) U.S. Cl.
CPC ........ *H04L 63/126* (2013.01); *H04L 63/0428* (2013.01)
(58) Field of Classification Search
CPC .......................... H04L 63/126; H04L 63/0428
See application file for complete search history.

(56) References Cited

U.S. PATENT DOCUMENTS 10,102,265 B1 * 10/2018 Madisetti ............... G06Q 20/06
10,250,395 B1 * 4/2019 Borne-Pons .......... H04L 9/3247
10,574,453 B2 * 2/2020 Notani ................... H04L 9/3297
2016/0275461 A1 * 9/2016 Sprague ............... H04L 9/3234
2019/0036957 A1 * 1/2019 Smith .................... H04L 9/3239

(Continued)

FOREIGN PATENT DOCUMENTS

CN 106960388 7/2017
CN 108259594 7/2018

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
Gao, "Introduction to Cross-chain Technology of Blockchain," JKGC Magazine, Nov. 2016, pp. 46-51 (with machine translation).
Li, "Research on Blockchain Technology Application of Bank Payment and Clearing in China," Chinese Master's Theses Full-text Database—Information Technology, Oct. 2018, 10: (with English abstract).

(Continued)

*Primary Examiner* — Harris C Wang
(74) *Attorney, Agent, or Firm* — Fish & Richardson P.C.

(57) ABSTRACT

One or more embodiments of the present specification provides cross-blockchain interaction systems. One system includes: one or more anchor devices, wherein at least one of the one or more anchor devices comprises a first client terminal associated with a first blockchain network, and wherein the first client terminal is configured to monitor cross-blockchain requests sent from the first blockchain network; and one or more relay devices, wherein at least one of the one or more relay devices comprises a second client terminal associated with a second blockchain network that monitors cross-blockchain requests intended for the second blockchain network.

20 Claims, 5 Drawing Sheets

(56) References Cited

U.S. PATENT DOCUMENTS

| | | | | |
|---|---|---|---|---|
| 2019/0058581 A1* | 2/2019 | Wood | ............ | G06F 16/27 |
| 2019/0182047 A1* | 6/2019 | Andreina | ............ | G06F 21/6281 |
| 2019/0305958 A1* | 10/2019 | Qiu | ............ | G06Q 20/02 |
| 2020/0184084 A1* | 6/2020 | Shockley | ............ | G06F 21/602 |
| 2021/0126794 A1* | 4/2021 | Forrester | ............ | G06F 16/27 |

FOREIGN PATENT DOCUMENTS

| | | |
|---|---|---|
| CN | 108269190 | 7/2018 |
| CN | 108667618 | 10/2018 |
| CN | 108683630 | 10/2018 |
| CN | 108701308 | 10/2018 |
| CN | 108712257 | 10/2018 |
| CN | 108768659 | 11/2018 |
| CN | 110035046 | 7/2019 |
| WO | WO2017176093 | 10/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/106610, dated Dec. 18, 2019, 9 pages (with partial English translation).

Wang et al., "Survey on Privacy Preserving Techniques for Blockchain," Chinese Journal on Internet of Things, Sep. 2018, 2(3):71-81 (with English abstract).

PCT International Preliminary Report on Patentability in International Application No. PCT/CN2019/106610, dated May 18, 2021, 9 pages (with English translation).

Ellis et al., "A Decentralized Oracle Network," ChainLink, Sep. 4, 2017, 38 pages.

Extended European Search Report in European Application No. 19884571.1, dated Sep. 1, 2021.

\* cited by examiner

CROSS-BLOCKCHAIN INTERACTION SYSTEMS

CROSS-REFERENCE TO RELATED APPLICATIONS

This application is a continuation of PCT Application No. PCT/CN2019/106610, filed on Sep. 19, 2019, which claims priority to Chinese Patent Application No. 201811364463.0, filed on Nov. 16, 2018, and each application is hereby incorporated by reference in its entirety.

TECHNICAL FIELD

One or more embodiments of the present specification relate to the field of blockchain technologies, and in particular, to cross-blockchain interaction systems.

BACKGROUND

In related technologies, cross-blockchain interaction between different blockchains can be implemented by using a relay chain. The relay chain can be connected to each blockchain. Several validators provided on the relay chain verify cross-blockchain data on each blockchain by using consensus algorithms, and other blockchains can obtain the cross-blockchain data provided that the blockchains are connected to the relay chain.

SUMMARY

In view of this, one or more embodiments of the present specification provide cross-blockchain interaction systems.

To achieve the previous objective, one or more embodiments of the present specification provide the following technical solutions:

According to one or more embodiments of the present specification, a cross-blockchain interaction system is proposed, including: one or more anchors, where when any anchor is selected by a first blockchain, the any anchor is configured with a client device of the first blockchain so as to monitor a cross-blockchain request on the first blockchain; and one or more relays, where when any relay is selected by a second blockchain, the any relay is configured with a client device of the second blockchain; and when a request object of the cross-blockchain request is the second blockchain, the any relay initiates a request to the second blockchain based on the cross-blockchain request and receives response data and a blockchain attestation that are returned by the second blockchain, so that the any relay verifies the response data based on the blockchain attestation and the any relay generates a corresponding relay attestation based on a configured trusted attestation conversion technology after the verification is passed, so that the response data and the relay attestation are returned to the first blockchain through the any anchor.

DETAILED DESCRIPTION

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with one or more embodiments of the present specification. On the contrary, the implementations are only examples of apparatuses and methods that are described in the appended claims in detail and that are consistent with some aspects of one or more embodiments of the present specification.

It is worthwhile to note that in other embodiments, steps of a corresponding method do not necessarily need to be performed in a sequence illustrated and described in the present specification. Methods in some other embodiments can include more or fewer steps than the methods described in the present specification. In addition, a single step described in the present specification may be divided into multiple steps for description in other embodiments, and multiple steps described in the present specification may alternatively be combined into a single step for description in other embodiments.

Figure 1:
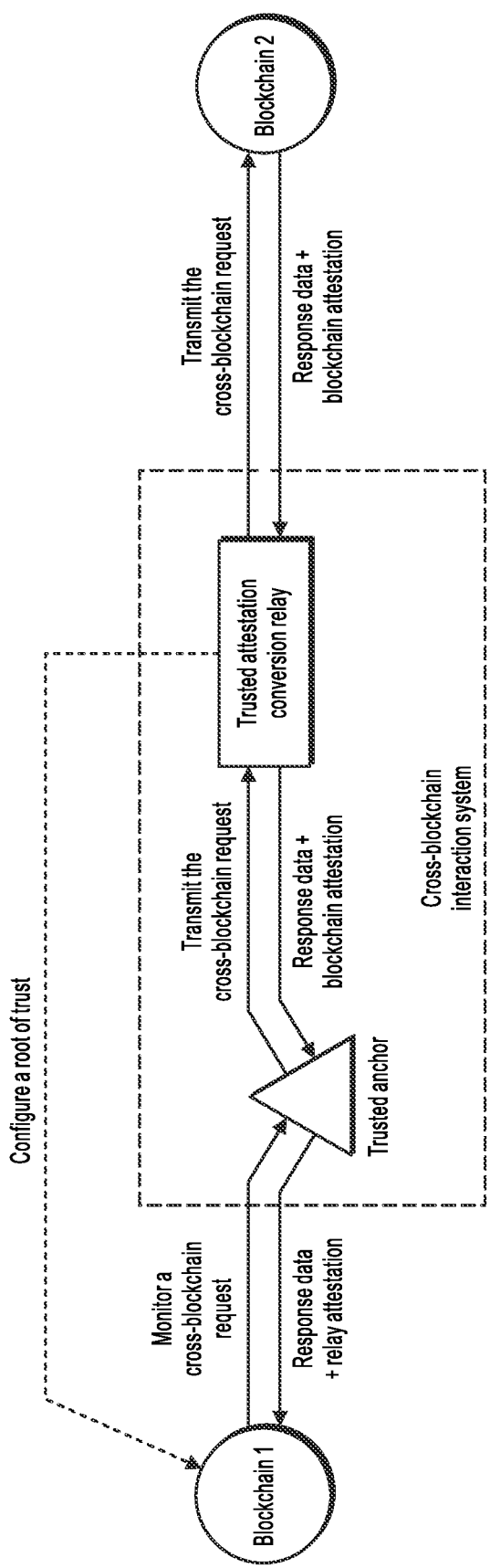
FIG. 1 is a schematic diagram illustrating cross-blockchain interaction, according to an example embodiment.

FIG. 1 is a schematic diagram illustrating cross-blockchain interaction according to an example embodiment. Cross-blockchain interaction between blockchain 1 and blockchain 2 shown in FIG. 1 is used as an example. Blockchain 1 and blockchain 2 can implement cross-blockchain interaction by using a cross-blockchain interaction system. The cross-blockchain interaction system can include a trusted anchor and a trusted attestation conversion relay. The trusted anchor can be configured with a client device of blockchain 1 so as to establish a connection between the trusted anchor and blockchain 1. The trusted attestation conversion relay can be configured with a client device of blockchain 2 so as to establish a connection between the trusted attestation conversion relay and blockchain 2.

In some embodiments, the client devices configured on the trusted anchor and the trusted attestation conversion relay can be simplified payment verification (SPV) client devices, to implement lightweight configuration of the trusted anchor and the trusted attestation conversion relay. Related cross-blockchain interaction functions can also be implemented by configuring other types of client devices. Implementations are not limited in the present specification.

In some embodiments, when blockchain 1 needs to retrieve cross-blockchain data from blockchain 2, a cross-blockchain request can be created on blockchain 1, and a request object of the cross-blockchain request is blockchain 2. The trusted anchor can monitor, by using the configured client device of blockchain 1, the cross-blockchain request created on blockchain 1, and transfer the cross-blockchain request to the trusted attestation conversion relay based on the fact that the request object indicated by the cross-blockchain request is blockchain 2 and a connection relationship between blockchain 2 and the trusted attestation conversion relay. The trusted attestation conversion relay further transfers the cross-blockchain request to blockchain 2.

Further, the trusted attestation conversion relay can retrieve, by using the configured client device of blockchain 2, response data generated by blockchain 2 in response to the cross-blockchain request, and return the response data to the trusted anchor. The trusted anchor can further return the response data to blockchain 1, thereby completing the cross-blockchain interaction between blockchain 1 and blockchain 2.

In addition to the response data, the trusted attestation conversion relay can further retrieve corresponding blockchain attestation from blockchain 2. The trusted attestation conversion relay can verify the response data based on the blockchain attestation, for example, determining that the response data exists in a blockchain ledger of blockchain 2. Implementations are not limited in the present specification. In addition, the trusted attestation conversion relay is configured with a trusted attestation conversion technology. As such, if the result of verifying the response data based on the blockchain attestation is passed, the trusted attestation conversion relay can generate a relay attestation based on the trusted attestation conversion technology. That is, the blockchain attestation is converted into the relay attestation. Then the trusted attestation conversion relay returns the response data and the relay attestation to the trusted anchor. The trusted anchor further returns the response data and the relay attestation to blockchain 1. The trusted attestation conversion relay can publish a root of trust in advance, and blockchain 1 can obtain and deploy the root of trust in advance. As such, after obtaining the response data and the relay attestation, blockchain 1 can verify the response data and the relay attestation based on the root of trust so as to determine that the trusted attestation conversion relay has verified the provided response data and the verification is passed.

It can be seen that by using the previous cross-blockchain interaction system, both the trusted anchor and the trusted attestation conversion relay need to be configured with a client device only for a blockchain that needs to be connected, instead of client devices for all blockchains participating in cross-blockchain interaction. As such, both the trusted anchor and the trusted attestation conversion relay can be very lightweight. In addition, different from a relay chain that is based on a consensus algorithm in an existing technology, the trusted attestation conversion relay is provided with the trusted attestation conversion technology so that the relay can be used to implement single-point attestation of reliability of the response data. A process of conversion to the relay attestation is more efficient and convenient than a consensus process. Therefore, cross-blockchain interaction efficiency can be improved while ensuring reliability of the response data. Moreover, the trusted attestation conversion relay obtains only one copy of attestation information (that is, the relay attestation), in comparison with multiple copies of attestation information provided by various validators in the relay chain in the related technology (where each validator provides one copy of attestation information). This greatly simplifies a process of verifying the attestation information by blockchain 1, thereby improving verification efficiency.

Figure 2:
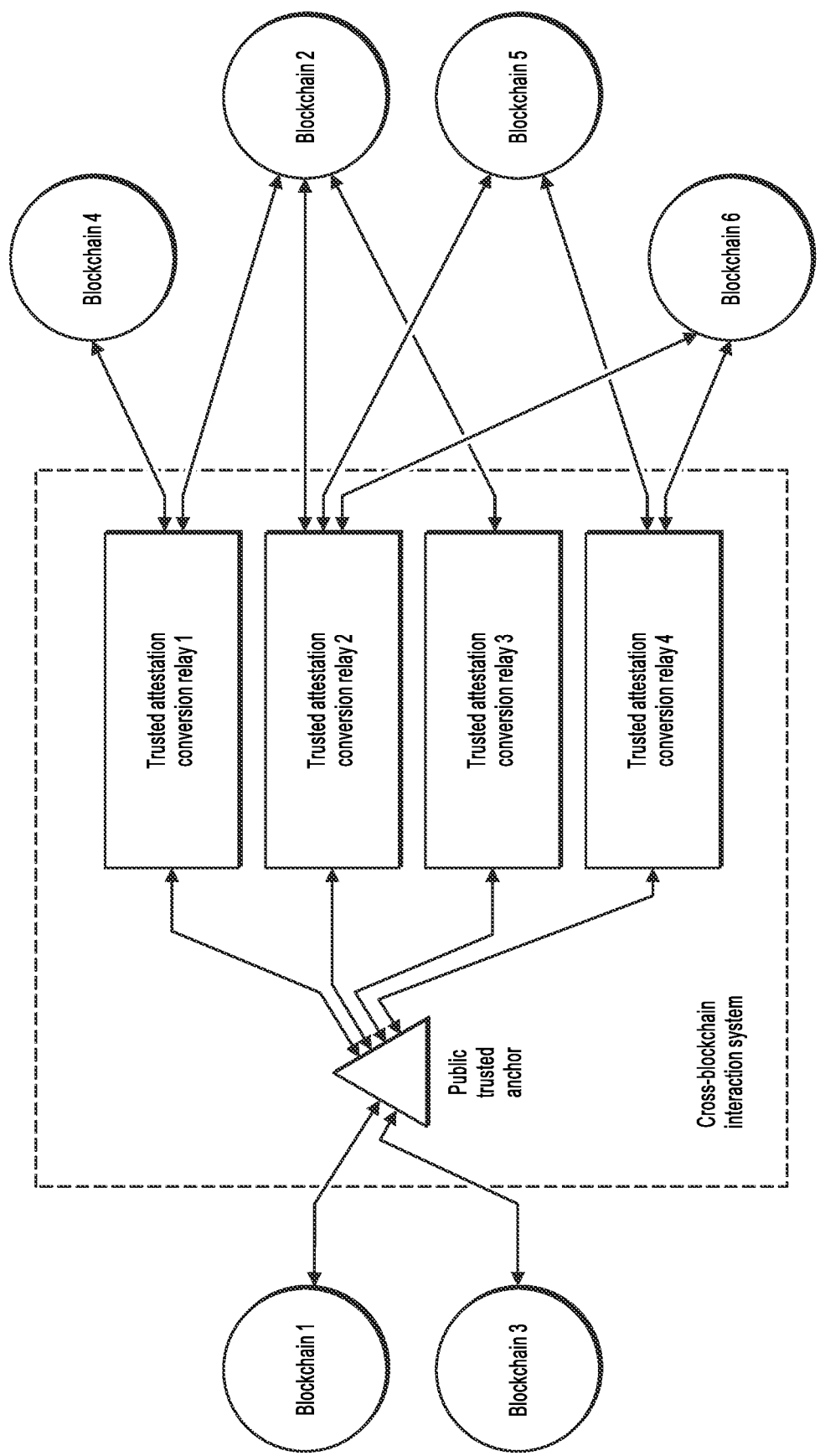
FIG. 2 is a schematic structural diagram illustrating a cross-blockchain interaction system, according to an example embodiment.

The cross-blockchain interaction system based on the previous structure supports scalable deployment based on actual traffic and capacity requirements and therefore has very high deployment flexibility. For example, FIG. 2 is a schematic structural diagram illustrating a cross-blockchain interaction system according to an example embodiment. As shown in FIG. 2, multiple trusted attestation conversion relays, for example, trusted attestation conversion relays 1 to 4, can be deployed in the cross-blockchain interaction system. On the one hand, the quantity of trusted attestation conversion relays can be increased to increase the quantity of blockchains that can be supported. On the other hand, each trusted attestation conversion relay can be configured with multiple types of trusted attestation conversion technologies, for example, the trusted execution environment (TEE) technology, the proof of authority (POA) technology, and the zero-knowledge proof (ZKP) technology. Implementations are not limited in the present specification. Different trusted attestation conversion technologies implement different performance models, security boundaries, etc. and therefore can satisfy application needs in different scenarios.

In some embodiments, trusted attestation conversion relay 1 can be configured with the TEE technology, trusted attestation conversion relay 2 can be configured with the POA technology, trusted attestation conversion relay 3 can be configured with the MPC technology, and trusted attestation conversion relay 4 can be configured with the ZKP technology. Blockchain 2 and blockchains 4 to 6 can select specific trusted attestation conversion relays based on actual needs, to perform trusted attestation conversion of blockchain attestations provided by the blockchains. For example, blockchain 2 can select trusted attestation conversion relays 1 to 3, and then trusted attestation conversion relays 1 to 3 each need to be configured with a client device of blockchain 2; blockchain 4 can select trusted attestation conversion relay 1, and then trusted attestation conversion relay 1 needs to be configured with a client device of blockchain 4; blockchain 5 can select trusted attestation conversion relays 2 and 4, and then trusted attestation conversion relays 2 and 4 each need to be configured with a client device of blockchain 5; and blockchain 6 can select trusted attestation conversion relays 2 and 4, and then trusted attestation conversion relays 2 and 4 each need to be configured with a client device of blockchain 6.

Figure 3:
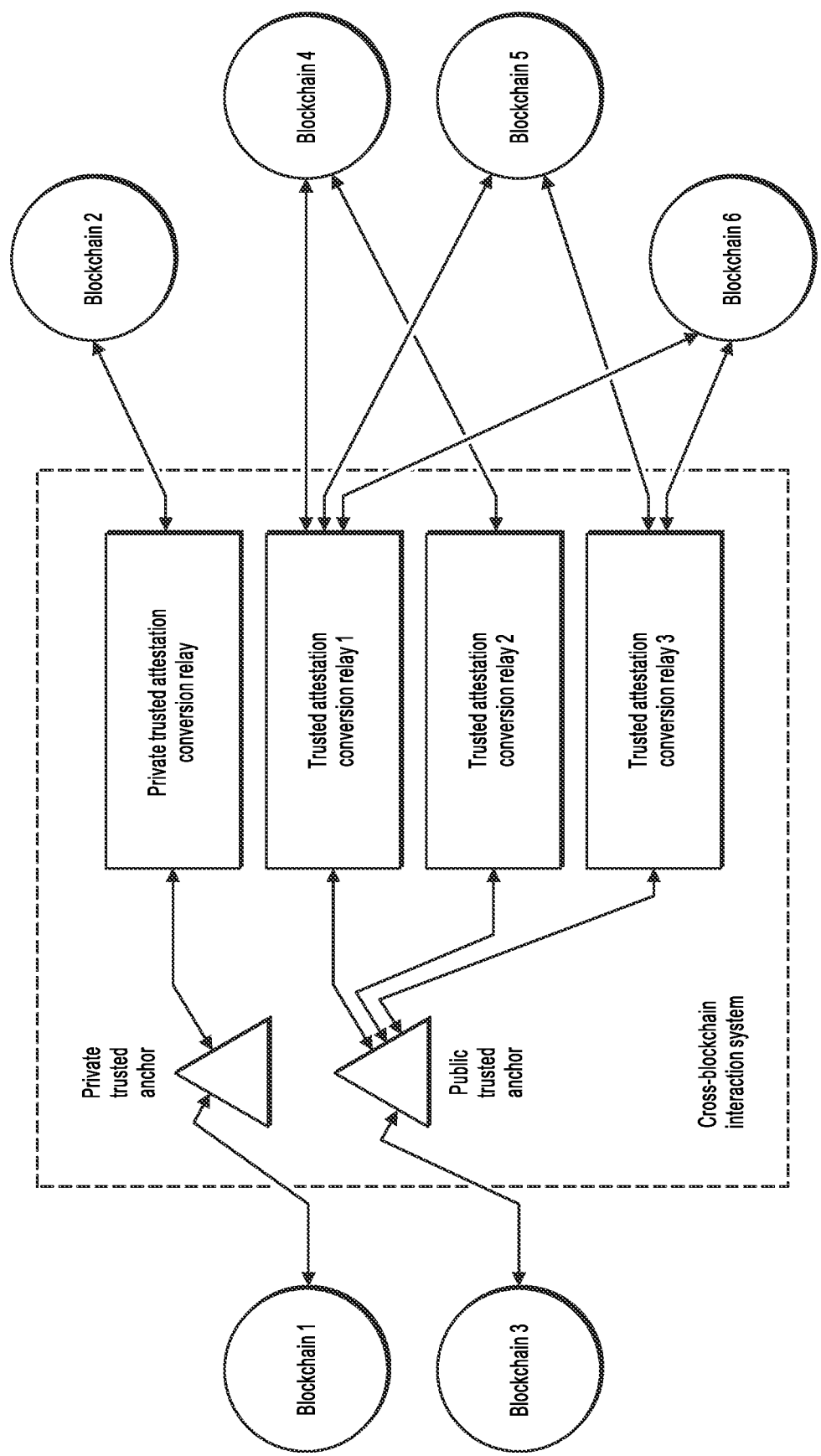
FIG. 3 is a schematic structural diagram illustrating another cross-blockchain interaction system, according to an example embodiment.

In some embodiments, blockchain 2 and blockchains 4 to 6 can share trusted attestation conversion relays 1 to 4. In other words, trusted attestation conversion relays 1 to 4 are public relays. This can reduce the quantity of identical trusted attestation conversion relays (that is, relays configured with the same trusted attestation conversion technology) in the cross-blockchain interaction system, thereby simplifying the system complexity. Certainly, the present specification does not limit the configuration of identical trusted attestation conversion relays in the cross-blockchain interaction system. For example, when a relatively large quantity of blockchains need to be invoked, because performance of a single trusted attestation conversion relay is limited, multiple identical trusted attestation conversion relays can be configured to implement traffic distribution to satisfy the performance requirement. For another example, identical trusted attestation conversion relays can be configured based on data privacy requirements. For example, FIG. 3 is a schematic structural diagram illustrating another cross-blockchain interaction system according to an example embodiment. Assume that trusted attestation conversion relay 1 is a public relay and is configured with a TEE technology and that blockchain expects to use the TEE technology to implement trusted attestation conversion and expects that the response data provided by blockchain 2 not be recorded in trusted attestation conversion relay 1 to prevent leakage. Then blockchain 2 can be configured with a private trusted attestation conversion relay. The private trusted attestation conversion relay is configured with the TEE technology. In addition, the private trusted attestation conversion relay is configured with only a client device of blockchain 2, and other blockchains cannot (for example, have no operation permission to) configure their client devices on the private trusted attestation conversion relay. Therefore, only blockchain 2 can use the private trusted attestation conversion relay.

In some embodiments, similar to the relays, trusted anchors can also include public and private anchors so as to satisfy different application needs. For example, as shown in FIG. 3, blockchain 3 can be connected to a public trusted anchor. The public trusted anchor can be configured with a client device of blockchain 3 so that the public trusted anchor can monitor a cross-blockchain request on blockchain 3 and assist blockchain 3 in obtaining response data provided by other blockchains. This is similar to the embodiment shown in FIG. 1. Details are omitted here for simplicity. Similarly, other blockchains can also be connected to the public trusted anchor. Therefore, the public trusted anchor can be configured with client devices of these blockchains and assist these blockchains in completing cross-blockchain interaction. Details are omitted here for simplicity. For another example, blockchain 1 can be configured with a private trusted anchor. The private trusted anchor is configured with a client device of blockchain 1, and other blockchains cannot (for example, have no operation permission to) configure their client devices on the private trusted anchor. Therefore, the private trusted anchor is only used to monitor a cross-blockchain request on blockchain 1 and assist blockchain 1 in completing cross-blockchain interaction.

It can be seen that based on the cross-blockchain interaction system shown in FIG. 3, a blockchain serving as the invoking party can select a private trusted anchor or a public trusted anchor based on actual needs, and a blockchain serving as the invoked party can select a private trusted attestation conversion relay or a public trusted attestation conversion relay based on actual needs, so as to satisfy privacy requirements of the blockchain serving as the invoking party or the invoked party.

It is worthwhile to note that each trusted attestation conversion relay in the present specification can logically be considered as "one device" so that after obtaining cross-blockchain data and a blockchain attestation that are returned by a blockchain serving as the invoked party, the trusted attestation conversion relay can convert the blockchain attestation into a trusted relay attestation based on a verification result of the cross-blockchain data and the blockchain attestation. In addition, there is only one relay attestation, in comparison with multiple attestations provided by multiple validators in the relay chain in the related technology. Certainly, each trusted attestation conversion relay can actually run on a single electronic device, for example, a physical server including an independent host, a PC, a notebook computer, or a cell phone. Or each trusted attestation conversion relay can run on a device cluster that includes multiple electronic devices, for example, a virtual server running on a host cluster. Implementations are not limited in the present specification.

Figure 4:
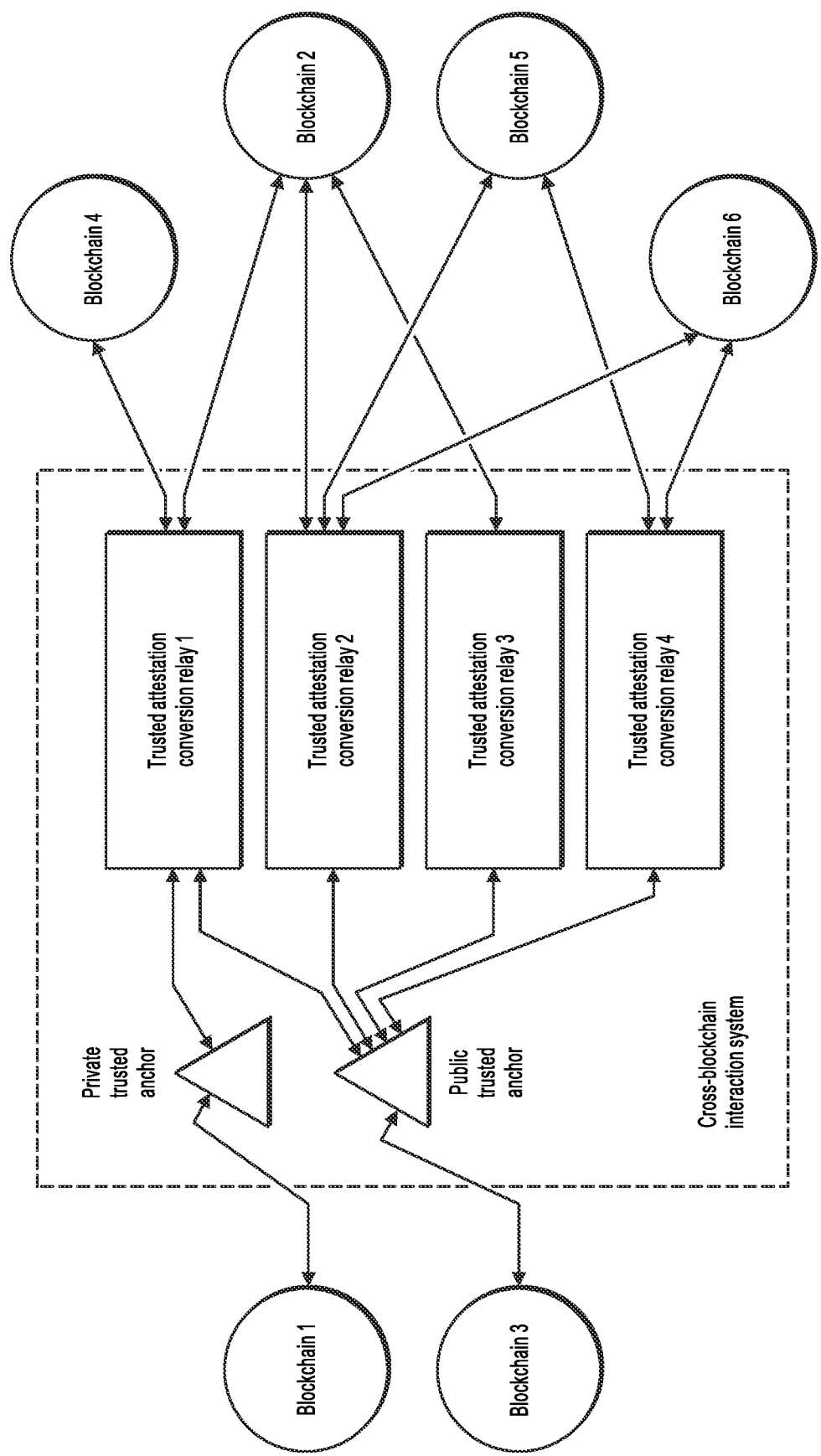
FIG. 4 is a schematic structural diagram illustrating still another cross-blockchain interaction system, according to an example embodiment.

FIG. 4 is a schematic structural diagram illustrating still another cross-blockchain interaction system according to an example embodiment. As shown in FIG. 4, when blockchain 1 selects a private trusted anchor, the private trusted anchor can be connected to public trusted attestation conversion relay 1 and is not necessarily connected to the private trusted attestation conversion relay shown in FIG. 3. In practice, if blockchain 1 serving as the invoking party has privacy needs and blockchain 2 serving as the invoked party has no privacy needs, blockchain 1 can select a private trusted anchor and blockchain 2 can select public trusted attestation conversion relay 1 so as to satisfy the actual needs of each blockchain.

Figure 5:
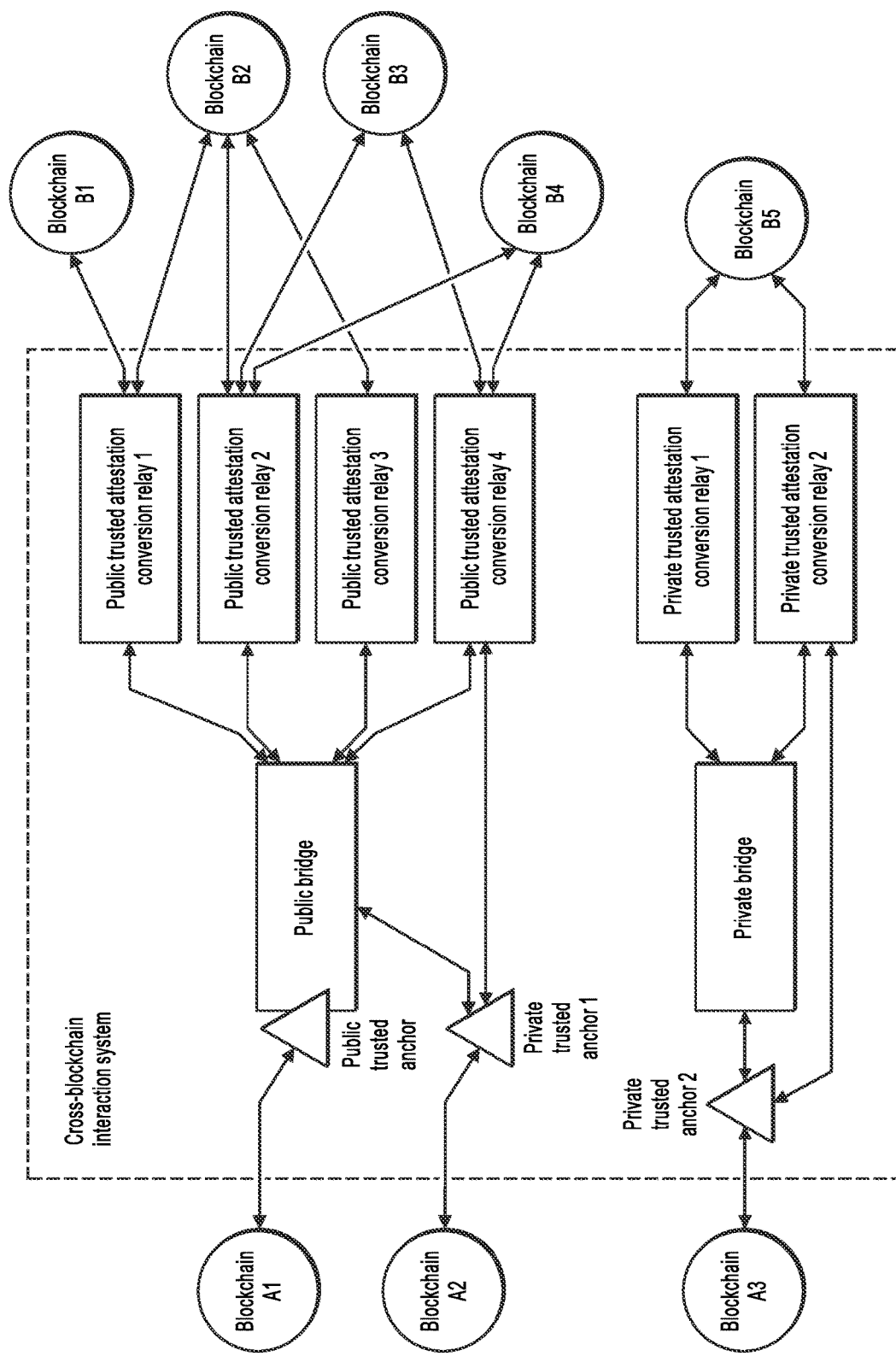
FIG. 5 is a schematic structural diagram illustrating a cross-blockchain interaction system that provides a bridging function, according to an example embodiment.

In the embodiments shown in FIG. 1 to FIG. 4, a connection is directly established between a trusted anchor and a trusted attestation conversion relay in the cross-blockchain interaction system. However, in other embodiments, for example, as shown in FIG. 5, which is a schematic structural diagram illustrating a cross-blockchain interaction system that provides a bridging function according to an example embodiment, a bridge can be provided. The bridge is separately connected to a trusted anchor and a trusted attestation conversion relay, to bridge the trusted anchor and the trusted attestation conversion relay.

For example, a public bridge is provided and is connected to public trusted attestation conversion relays such as public trusted attestation conversion relays 1 to 4. The public bridge can be connected to a public trusted anchor. For example, the public trusted anchor can be directly configured on the public bridge. Certainly, Implementations are not limited in the present specification. Alternatively, the public bridge can be connected to private trusted anchor 1 or other private trusted anchors. Then, when blockchain A1 is connected to the public trusted anchor, and blockchains B1 to B4 are separately connected to the public trusted attestation conversion relays, blockchain A1 can implement cross-blockchain interaction with blockchains B1 to B4. When blockchain A2 is connected to private trusted anchor 1 and blockchains B1 to B4 are separately connected to the public trusted attestation conversion relays, blockchain A2 can implement cross-blockchain interaction with blockchains B1 to B4.

For another example, a private bridge is provided and is separately connected to private trusted anchor 2 and private trusted attestation conversion relays 1 and 2. When blockchain A3 is connected to private trusted anchor 2 and blockchain B5 is connected to private trusted attestation conversion relays 1 and 2, blockchain A3 can implement cross-blockchain interaction with blockchain B5.

Certainly, as described above, bridges such as the public bridge and the private bridge are non-essential. For example, private trusted anchor 1 can be directly connected to public trusted attestation conversion relay 4, private trusted anchor 2 can be directly connected to private trusted attestation conversion relay 2, and the public trusted anchor can also be directly connected to specified public or private trusted attestation conversion relays, to implement cross-blockchain interaction between related blockchains.

Although bridges are categorized into public bridges and private bridges in the previous embodiments, in practice, bridges alternatively do not have to be categorized. For example, a blockchain can be separately connected to a public trusted anchor, a private trusted anchor, a public trusted attestation conversion relay, and a private trusted attestation conversion relay through the same bridge, provided that the corresponding bridging function can be implemented. Certainly, a blockchain with relatively high data privacy requirements can choose to use a detected bridge, which is equivalent to the previous private bridge.

In summary, the present specification proposes the new cross-blockchain interaction systems. In such systems, blockchains are connected to standalone trusted attestation conversion relays instead of a centralized relay chain. As such, the systems are not only more lightweight and also support flexible deployment of trusted attestation conversion relays based on traffic and capacity needs. In addition, specific trusted attestation conversion technologies can be selected and configured based on actual needs without being limited to methods such as consensus algorithms. Moreover, blockchains can be configured with public or private trusted anchors, trusted attestation conversion relays, and bridges. The related public nodes can satisfy rapid configuration of public blockchains. The related private nodes can prevent privacy data from being obtained by other blockchains, satisfy the privacy requirements of some blockchains, and satisfy the application needs of private blockchains or consortium blockchains with access permissions.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change RAM (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by a computing device. Based on the definition in the present specification, the computer readable medium does not include transitory computer readable media such as a modulated data signal and carrier.

It is worthwhile to further note that, the terms "include", "contain", or their any other variants are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or can be advantageous.

Terms used in one or more embodiments of the present specification are merely used to describe specific embodiments, and are not intended to limit the one or more embodiments of the present specification. The terms "a" and "the" of singular forms used in one or more embodiments of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more embodiments of the present specification to describe various types of information, the information is not limited to these terms. These terms are only used to differentiate between information of the same type. For example, without departing from the scope of one or more embodiments of the present specification, first information can also be referred to as second information, and similarly, the second information can also be referred to as the first information. Depending on the context, for example, the word "if" used here can be explained as "while", "when", or "in response to determining".

The previous descriptions are only example embodiments of one or more embodiments of the present specification, but are not intended to limit the one or more embodiments of the present specification. Any modification, equivalent replacement, improvement, etc. made without departing from the spirit and principle of the one or more embodiments of the present specification shall fall within the protection scope of the one or more embodiments of the present specification.

What is claimed is:

1. A cross-blockchain interaction system, comprising:
   one or more anchor devices, wherein at least one of the one or more anchor devices comprises a first client terminal associated with a first blockchain network, and wherein the first client terminal is configured to monitor cross-blockchain requests sent from the first blockchain network;
   one or more relay devices, wherein at least one of the one or more relay devices comprises a second client terminal associated with a second blockchain network that monitors cross-blockchain requests intended for the second blockchain network; and
   at least one bridge device coupled to and in two-way communication with the one or more anchor devices and the one or more relay devices, and wherein the at least one of the one or more relay devices is configured to perform operations comprising:
   detecting a cross-blockchain request sent from the first blockchain network through an anchor device of the one or more anchor devices;
   initiating a request to the second blockchain network in response to detecting the cross-blockchain request;
   receiving a response and a blockchain attestation sent from the second blockchain network;
   verifying the response based on the blockchain attestation;

converting the blockchain attestation into a relay attestation using a trusted attestation conversion technology after the response is verified; and sending the response and the relay attestation to the first blockchain network through the anchor device.

2. The system according to claim 1, wherein the at least one of the one or more anchor devices is at least one private anchor device configured for the first blockchain network.

3. The system according to claim 1, wherein the at least one of the one or more relay devices comprises at least one private relay device configured for the second blockchain network.

4. The system according to claim 1, wherein the one or more relay devices comprises a plurality of relay devices and wherein different relay devices in the plurality of relay devices generate relay attestations based on different trusted attestation conversion technologies.

5. The system according to claim 1, wherein the at least one bridge device is configured to forward the cross-blockchain requests from the one or more anchor devices to the at least one of the one or more relay devices and forward the response and the relay attestation from the at least one of the one or more relay devices to the at least one of the one or more anchor devices.

6. The system according to claim 5, wherein the at least one bridge device comprises at least one private bridge device for cross-blockchain communications between the first blockchain network and the second blockchain network.

7. The system according to claim 5, wherein the at least one bridge device comprises a public bridge device, the at least one of the one or more anchor devices comprises a public anchor device, and the at least one of the one or more relay devices comprises a public relay device.

8. The system according to claim 1, wherein the first client terminal is configured to perform simplified payment verification (SPV) on a first blockchain associated with the first blockchain network, and the at least one of the one or more relay devices is configured to perform SPV on a second blockchain associated with second blockchain network.

9. The system according to claim 1, wherein the trusted attestation conversion technology comprises one or more of a trusted execution environment (TEE) technology, a proof of authority (POA) technology, a secure multi-party computation technology, or a zero-knowledge proof (ZKP) technology.

10. The system according to claim 1, wherein a root of trust of the at least one of the one or more relay devices is pre-recorded on a blockchain to be used by blockchain nodes of the first blockchain network to verify the response and the relay attestation.

11. A non-transitory, computer-readable medium storing one or more instructions executable by a computer system to perform operations comprising:

one or more anchor devices, wherein at least one of the one or more anchor devices comprises a first client terminal associated with a first blockchain network, and wherein the first client terminal is configured to monitor cross-blockchain requests sent from the first blockchain network;

one or more relay devices, wherein at least one of the one or more relay devices comprises a second client terminal associated with a second blockchain network that monitors cross-blockchain requests intended for the second blockchain network; and at least one bridge device coupled to and in two-way communication with the one or more anchor devices and the one or more relay devices, and wherein the at least one of the one or more relay devices is configured to perform the operations comprising:

detecting a cross-blockchain request sent from the first blockchain network through an anchor device of the one or more anchor devices;

initiating a request to the second blockchain network in response to detecting the cross-blockchain request;

receiving a response and a blockchain attestation sent from the second blockchain network;

verifying the response based on the blockchain attestation;

converting the blockchain attestation into a relay attestation using a trusted attestation conversion technology after the response is verified; and sending the response and the relay attestation to the first blockchain network through the anchor device.

12. The non-transitory, computer-readable medium according to claim 11, wherein the at least one of the one or more anchor devices is at least one private anchor device configured for the first blockchain network.

13. The non-transitory, computer-readable medium according to claim 11, wherein the at least one of the one or more relay devices comprises at least one private relay device configured for the second blockchain network.

14. The non-transitory, computer-readable medium according to claim 11, wherein the one or more relay devices comprises a plurality of relay devices and wherein different relay devices in the plurality of relay devices generate relay attestations based on different trusted attestation conversion technologies.

15. The non-transitory, computer-readable medium according to claim 11, wherein the at least one bridge device is configured to forward the cross-blockchain requests from the one or more anchor devices to the at least one of the one or more relay devices and forward the response and the relay attestation from the at least one of the one or more relay devices to the at least one of the one or more anchor devices.

16. The non-transitory, computer-readable medium according to claim 15, wherein the at least one bridge device comprises at least one private bridge device for cross-blockchain communications between the first blockchain network and the second blockchain network.

17. The non-transitory, computer-readable medium according to claim 15, wherein the at least one bridge device comprises a public bridge device, the at least one of the one or more anchor devices comprises a public anchor device, and the at least one of the one or more relay devices comprises a public relay device.

18. The non-transitory, computer-readable medium according to claim 11, wherein the first client terminal is configured to perform simplified payment verification (SPV) on a first blockchain associated with the first blockchain network, and the at least one of the one or more relay devices is configured to perform SPV on a second blockchain associated with second blockchain network.

19. The non-transitory, computer-readable medium according to claim 11, wherein the trusted attestation conversion technology comprises one or more of a trusted execution environment (TEE) technology, a proof of authority (POA) technology, a secure multi-party computation technology, or a zero-knowledge proof (ZKP) technology.

20. The non-transitory, computer-readable medium according to claim 11, wherein a root of trust of the at least one of the one or more relay devices is pre-recorded on a blockchain to be used by blockchain nodes of the first blockchain network to verify the response and the relay attestation.

* * * * *